UNITED STATES PATENT OFFICE.

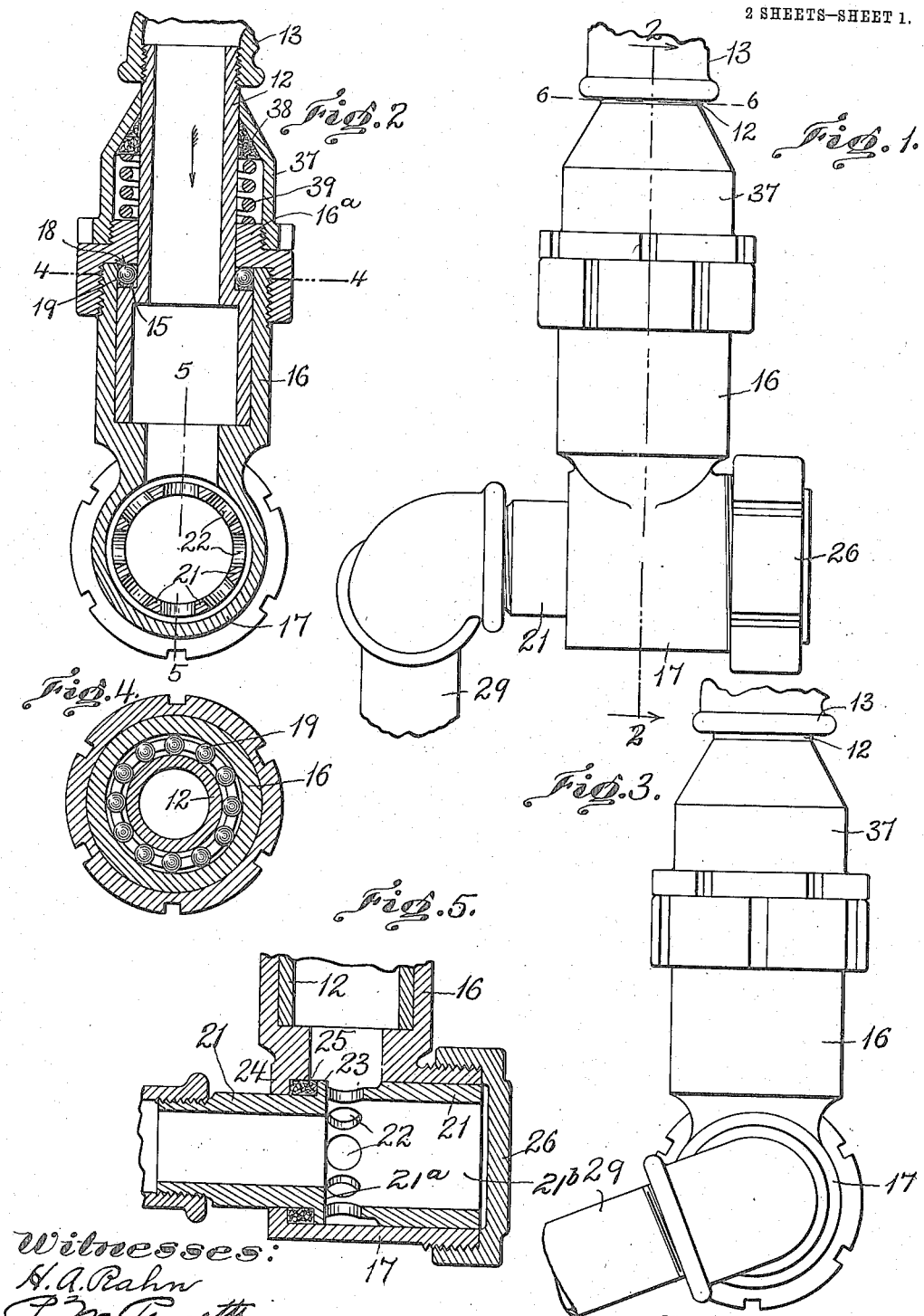

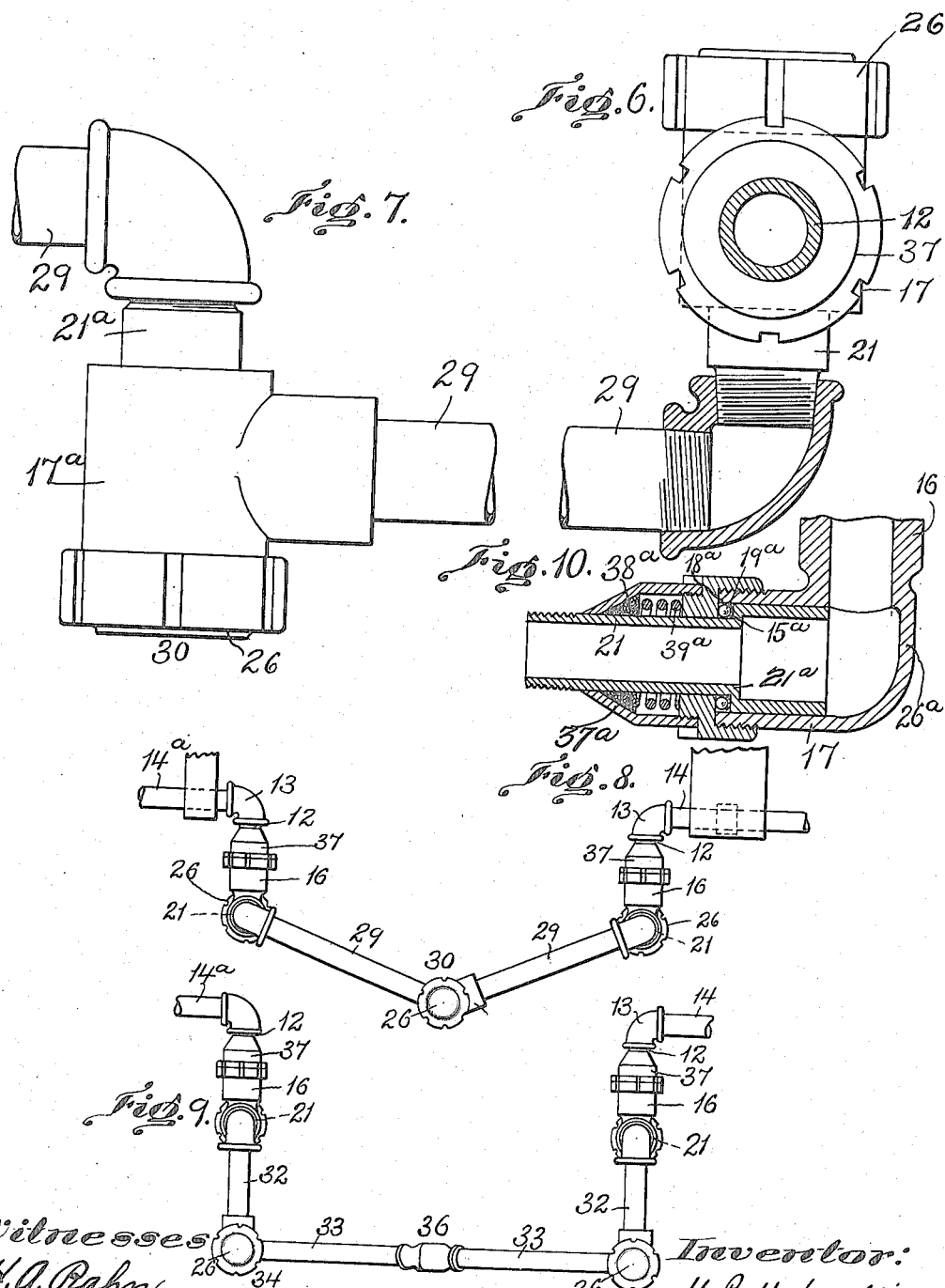

MILTON P. McLAUGHLIN, OF WAKEFIELD, MASSACHUSETTS.

FLEXIBLE CONDUIT.

1,128,798.

Specification of Letters Patent.

Patented Feb. 16, 1915.

Application filed February 5, 1914. Serial No. 816,790.

*To all whom it may concern:*

Be it known that I, MILTON P. McLAUGHLIN, a citizen of the United States, and a resident of Wakefield, in the county of Middlesex and State of Massachusetts, have invented certain new and useful Improvements in Flexible Conduits, of which the following is a specification.

This invention relates to the flexible portions of steam conduits employed on railway trains for heating cars by steam from the boiler of the engine, said flexible portions being located between the train units, which include the engine, tender and cars, and conforming to independent movements of said units.

The object of the invention is to provide a flexible conduit of maximum flexibility and durability, and of simple construction.

The invention consists in the improvements which I will now proceed to describe and claim.

Of the accompanying drawings forming a part of this specification: Figure 1 represents a side view showing three parts or members of a flexible conduit embodying my invention; Fig. 2 represents a section on line 2—2 of Fig. 1; Fig. 3 represents a side view of the parts shown by Fig. 1, taken from a different point; Fig. 4 represents a section on line 4—4 of Fig. 2; Fig. 5 represents a section on line 5—5 of Fig. 2; Fig. 6 represents a section on line 6—6 of Fig. 1, and a top plan view, partly in section, of the parts below said line; Fig. 7 represents a top plan view showing other parts of the conduit; Fig. 8 represents a side view of a complete flexible conduit adapted for use between an engine and its tender; Fig. 9 represents a side view of a complete flexible conduit adapted for use between two cars; Fig. 10 represents a view similar to Fig. 5, showing an antifrictional connecting means and packing means like those shown by Fig. 2.

The same reference characters indicate the same or similar parts in all the views.

The terms vertical and horizontal hereinafter employed are used relatively to convey the idea that the parts or portions described as vertical are substantially at right angles with the parts or portions described as horizontal.

In the drawings 12 represents a fixed vertical conduit member attached by an elbow 13 or otherwise to a fixed conduit 14 which, as shown by Fig. 8, may be understood to be attached to a locomotive, and, as shown by Fig. 9, may be understood to be attached to a tender or to a car. The fixed member 12 is enlarged at its lower portion to form an upwardly facing annular shoulder or ball seat 15.

Rotatably mounted upon the enlargement of fixed member 12, is a coupling member, said coupling member being provided with an annular shoulder against which the lower end of the enlargement of member 16 contacts. A bearing member 16$^x$ is secured to the upper end of the coupling member in suitable manner preferably by threaded engagement, said bearing member having a downwardly facing ball seat 18 and an upwardly extended tubular boss 16$^a$. The ball seat 18 rests upon anti-friction balls 19 interposed between the same and the ball seat 15. The ball seats and balls constitute connecting means for supporting and preventing vertical displacement of the angular member, said means being antifrictional so that the angular member turns with the minimum of frictional resistance.

The horizontal portion 17 of the angular member constitutes a bearing in which a horizontal conduit member 21 is adapted to turn. Said horizontal conduit member communicates with the vertical and angular conduit members either through ports 22 as shown by Figs. 2 and 5, or through its open inner end as shown by Fig. 10. Means are provided for confining or preventing outward endwise displacement of the horizontal member 21. Said means may comprise opposed flanges 23, 24 and a practically incompressible packing ring 25 as shown by Fig. 5, or ball seats 15$^a$, 18$^a$ and interposed balls 19$^a$ as shown by Fig. 10, the last mentioned means being antifrictional. One end of the horizontal portion 17 may be closed by a removable head 26 (Fig. 5) or by an integral head 26$^a$ (Fig. 10). Inward endwise displacement of the horizontal member 21 is prevented by the fluid pressure acting against the shoulder or face 21$^a$ within said member, said pressure forcing the member 21 outwardly to the limit permitted by the confining means.

The parts above described constitute a set located at one end of the space bridged by the entire coupling, a duplicate set being provided at the opposite end of said space as shown by Figs. 8 and 9, in which 14$^a$ represents a fixed pipe or conduit section attached in the construction shown by Fig. 8 to a tender, and in the construction shown by Fig. 9 to a car. In Fig. 8 said sets are shown as flexibly connected by pipes 29 (Fig. 8) attached at their outer ends to the horizontal members 21 and flexibly connected at their inner ends by a joint at 30 which may be composed of conduit members 17ª and 21ª constructed like the members 17 and 21. In Fig. 9 the two sets are shown as connected by two pairs of pipes 32, 33, the pipes of each pair being flexibly connected by joints at 34, 34, each of which may be similar to the joint at 30. The meeting ends of the pipes 33 may be detachably connected by a coupling at 36, which may be of any suitable construction.

37 represents a packing sleeve detachably secured to the boss 16ª, as shown by Fig. 2, and having a tapered end portion inclosing a tapered packing 38 which is pressed into the tapered end of the chamber by means of a spring 39 one end of which bears against boss 16ª, a steam-tight joint being thus formed. A similar packing chamber 37ª containing a packing 38ª and spring 39ª may be applied to the horizontal coupling member 21 as shown by Fig. 10.

The portion 17 of the angular conduit member constitutes a conduit extension which is located at or projects from one side of the vertical axis of the angular member. The horizontal conduit member 21 also has an extension within the portion 17. Said extensions and the head 26 are located at the opposite side of the vertical axis of the angular member from the main conduit portion of the horizontal member 21, so that the center of gravity of the angular member and the horizontal member is located at or near the vertical axis of the angular member, which is thereby enabled to turn with the minimum of frictional resistance. The said extensions form a *cul-de-sac* or pocket 21ᵇ in which stagnant fluid accumulates at one side of the path of the general stream, this stagnant fluid reducing to the minimum the friction of the flowing stream where its direction is changed from a vertical to a horizontal direction.

It is obvious that the described flexible conduit may be used for conducting air or other fluids as well as steam.

Having described my invention, I claim:

1. A flexible conduit comprising a conduit member forming a fixed journal and provided with a bearing seat, a coupling member rotatably mounted upon said fixed journal and provided with a bearing sleeve arranged at an angle to the bore of the conduit member, a bearing member having one end connected to said coupling member and provided with a bearing seat coöperating with the first mentioned bearing seat to support said coupling member, a packing sleeve connected to the other end of said bearing member, and surrounding said fixed journal, packing within said sleeve, means coöperating with said bearing member to maintain a pressure upon said packing, and a second conduit member rotatably mounted in said bearing sleeve.

2. A flexible conduit comprising a conduit member forming a fixed journal and provided with a bearing seat, a coupling member rotatably mounted upon said fixed journal and provided with a bearing sleeve arranged at an angle to the bore of the conduit member, a bearing member having one end connected to said coupling member and provided with a bearing seat coöperating with the first mentioned bearing seat to support said coupling member, a packing sleeve connected to the other end of said bearing member, and surrounding said fixed journal, said sleeve being tapered at one end, packing within the tapered portion of said sleeve, means coöperating with said bearing member to retain said packing within said tapered portion, and a second conduit member rotatably mounted in said bearing sleeve.

3. A flexible conduit comprising a conduit member forming a fixed journal and provided with a bearing seat, a coupling member rotatably mounted upon said fixed journal and provided with a bearing sleeve arranged at an angle to the bore of the conduit member, a bearing member having one end connected to said coupling member and provided with a bearing seat coöperating with the first mentioned bearing seat to support said coupling member, a packing sleeve connected to the other end of said bearing member, and surrounding said fixed journal, said packing sleeve having a tapered portion, packing within said tapered portion, a spring having one end bearing against said packing, and the other bearing against said bearing member, said spring encircling said fixed journal, and a second conduit member rotatably mounted in said bearing sleeve.

4. A flexible conduit comprising a conduit member forming a fixed journal and provided with a bearing seat, a coupling member rotatably mounted upon said fixed journal, a bearing member having one end connected to said coupling member and provided with a bearing seat coöperating with the first mentioned bearing seat to support said coupling member, a packing sleeve connected to the other end of said bearing member and surrounding said fixed journal, packing within said sleeve, and means coöperating with said bearing member to maintain a pressure upon said packing.

5. A flexible conduit comprising an angular coupling member, conduit members rotatably engaging the respective arms of said coupling member, and each provided with a bearing seat, bearing members each connected at one end with the respective arms of the coupling member and also provided at said connected ends with bearing seats coöperating with the bearing seats of said conduit members, packing sleeves carried by the other ends of the respective bearing members and inclosing the respective conduit members, packing in said sleeves, and means coöperating with said bearing members for maintaining a pressure upon said packing.

6. A flexible conduit comprising an angular coupling member, having in each of its arms a bearing seat, conduit members rotatably engaging the arms of the coupling member, and provided with bearing seats opposed to the seats of the angular coupling member, one of said conduit members being fixed and constituting a journal whereon one arm of the angular coupling member is rotatable, while the other conduit member is rotatable in the other arm of the angular coupling member, the bearing seat of the fixed conduit member supporting the angular coupling member and the rotatable conduit member engaged therewith, the said rotatable conduit member being provided with an internal shoulder through which fluid pressure is exerted in an outward endwise direction on said rotatable member.

In testimony whereof I have affixed my signature, in presence of two witnesses.

MILTON P. McLAUGHLIN.

Witnesses:
C. F. Brown,
P. W. Pezzetti.